(12) United States Patent
Van Houten et al.

(10) Patent No.: US 7,937,202 B2
(45) Date of Patent: May 3, 2011

(54) SEAT BELT/ACCELERATOR BEHAVIORAL SYSTEM

(76) Inventors: Ronald Van Houten, Kalamazoo, MI (US); Richard Schulman, Kalamazoo, MI (US); Jeffrey Tenenbaum, West Bloomfield, MI (US)

(*) Notice: Subject to any disclaimer, the term of this patent is extended or adjusted under 35 U.S.C. 154(b) by 457 days.

(21) Appl. No.: 12/113,715

(22) Filed: May 1, 2008

(65) Prior Publication Data

US 2008/0275616 A1    Nov. 6, 2008

Related U.S. Application Data

(60) Provisional application No. 60/915,258, filed on May 1, 2007.

(51) Int. Cl.
*G06F 19/00* (2006.01)
*G06F 7/70* (2006.01)
*G06G 7/00* (2006.01)
*G06G 7/76* (2006.01)

(52) U.S. Cl. ............... 701/70; 701/36; 701/45; 340/457; 340/457.1

(58) Field of Classification Search ............... 701/36, 701/45–47, 49, 70; 180/269, 271, 281, 282, 180/286; 280/734, 735; 340/457, 457.1; 297/463.2, 468; 75/512, 513
See application file for complete search history.

(56) References Cited

U.S. PATENT DOCUMENTS

| | | | |
|---|---|---|---|
| 3,815,086 A | | 6/1974 | Minton et al. |
| 4,319,658 A | * | 3/1982 | Collonia et al. ............... 180/271 |
| 4,574,757 A | | 3/1986 | Schulman et al. |
| 4,590,909 A | | 5/1986 | Heintz |
| 5,172,785 A | * | 12/1992 | Takahashi ..................... 180/271 |
| 5,717,387 A | | 2/1998 | Suman et al. |
| 6,540,040 B1 | | 4/2003 | Patel |
| 6,684,972 B2 | | 2/2004 | Oyaski |
| 6,766,713 B2 | * | 7/2004 | Sundaresan et al. ............ 74/512 |
| 6,860,355 B2 | | 3/2005 | Van Houten et al. |
| 6,948,136 B2 | | 9/2005 | Trewin |
| 6,977,582 B2 | * | 12/2005 | Ota et al. .................... 340/457.1 |
| 7,011,605 B2 | | 3/2006 | Shields |
| 7,093,515 B2 | * | 8/2006 | Yamanoi et al. ................ 74/513 |
| 7,298,250 B2 | | 11/2007 | Inoue |
| 7,343,234 B2 | * | 3/2008 | Kameyama ..................... 701/36 |
| 7,565,230 B2 | * | 7/2009 | Gardner et al. ................. 701/35 |

* cited by examiner

*Primary Examiner* — Jack Keith
*Assistant Examiner* — Rami Khatib
(74) *Attorney, Agent, or Firm* — Harold W. Milton, Jr.; Dickinson Wright, PLLC

(57) ABSTRACT

The computer 26 sends actuating signals to the resistive device 38 to resist the occupant input to the accelerator 22, but only when the vehicle speed exceeds a threshold while the seat belt 24 is not fastened about the occupant 28. This invention is characterized by applying the resistance and adjusting the threshold in proportion to the number of times the seat belt 24 is not fastened while the vehicle speed exceeds the threshold compared with the number of times the vehicle 20 exceeds the threshold speed. Also, the threshold may be adjusted so resistance may be applied at speeds that would normally be acceptable to have the seat belt 24 unfastened when the vehicle 20 is operated at these speeds too often.

16 Claims, 3 Drawing Sheets

SEAT BELT/ACCELERATOR BEHAVIORAL SYSTEM

CROSS REFERENCE TO RELATED APPLICATION

This application claims the benefit of provisional application Ser. No. 60/915,258 filed May 1, 2007.

BACKGROUND OF THE INVENTION

1. Field of the Invention

The invention relates to a method and apparatus for controlling the behavior of an occupant of a vehicle to encourage compliance with desired operating conditions.

2. Description of the Prior Art

Several vehicles are known that encourage vehicle occupants to comply with desired operating conditions, for example, proper use of the seat belt. The vehicles that contain these systems contain at least one occupant input device to which the occupant can apply some input such as an accelerator pedal, on/off button, or a volume knob to establish some operational mode such as vehicle speed, air-conditioning fan being on, or the radio being at an audible level proportional to vehicle speed.

These systems also include sensors to detect directly when any occupant input has been applied to the input device or indirectly what effect that input has had. For example, some systems will detect directly how far an occupant has depressed an accelerator pedal, while others will instead measure the vehicle speed which is generally but indirectly established by the occupant applying input to the accelerator.

The purpose is to encourage the vehicle occupant to comply with desired operating conditions. So, besides having an input device that can establish an operational mode, the vehicle also has an auxiliary device such as a seat belt or a gas cap. In addition, in order for the system to encourage desired occupant behavior, it also includes sensors that establish whether the auxiliary mode is established or not. For example, sensors sense if the seat belt is fastened or if the gas cap is closed.

Vehicles of this type include a system that affirmatively encourages the occupant to comply with the desired operating conditions. This encouragement comes in the form of a system to apply resistance to the operator input device. For example, the movement of the gear selector may be blocked, the depressing of the accelerator pedal may be met with resistance, or the turning of a knob might be met with greater resistance. Other examples are visual or audio alarms.

Lastly, a control module responds to the sensors that sense the operational and auxiliary modes to actuate the system when the operational conditions are not met. The control module uses a signal generator to actuate the system. Also it is common for such control modules to be capable of counting events, storing collected data, and performing calculations on data. A comparator for such control module relates one set of data to another to establish ratios that the control module then uses to actuate the resistive device in response to the data.

Several vehicles with methods of operation that encourage the use of occupant constraints are known. For example, the U.S. Pat. No. 7,093,515 to Yamonoi discloses an apparatus that applies resistance to the operation of an accelerator pedal when the driver seat belt is not fastened. The U.S. Pat. No. 6,977,582 to Katsuhisa discloses notifications to vehicle occupants that change according to vehicle speed.

There are also numerous examples of vehicles that block the shifting of the transmission of the vehicle when the seat belt is not fastened. One example is U.S. Pat. No. 6,860,355 to to Van Houten wherein the blocking of the shifting of the vehicle transmission depends on the frequency of fastening the seat belt. Other devices are known that recognize and accommodate operator traits.

The prior art struggles at effectively encouraging certain conditions in the operation of the vehicle to be met while not burdening or annoying the occupant under circumstances where these conditions are not beneficial. The prior art was inadequate because it failed to encourage occupants to comply with desired vehicle operating conditions to the extent that was needed. This could not be accomplished because under the amount of encouragement required by some would be an unacceptable intrusion to other occupants who need only very mild encouragement (like a reminder).

SUMMARY OF THE INVENTION ADVANTAGES

The subject invention provides for such a vehicle and method of operation characterized by a control module actuating the system to apply resistance only in proportion to the ratio of the number of incidents to the number of times the operational mode exceeds the threshold, and adjusting the threshold proportionally to the ratio and in response to stored data.

In other words, and in accordance with the subject invention, an occupant will experience difficulty in operating a vehicle control whenever certain conditions are not met, and the level of difficulty of operating the control and how soon the difficulty is experienced is according to the rate these conditions are not met. Also, the conditions desired adjust according to how often they are not met and when normally safe conditions are exceeded too often. This invention solves many of the old shortcomings by combining some previous methods with an ingenious method of applying an adaptable response to the occupant that is proportional to the occupant's behavior. It increases the level of intrusiveness until the encouragement is effective, and the encouragement is no more intrusive than is necessary to be effective. This increases the level of effectiveness of the encouragement and the acceptance of the invention by the public.

The vehicle and method in this invention is particularly well-suited to the encouragement of seat belt use. Using this invention, an occupant is less likely to be penalized for not wearing the seat belt in conditions where use should be discretionary. Under the prior art, the occupant might be prevented from operating the vehicle without the seat belt even in emergency situations. Also, the occupant is typically penalized the same for not wearing a seat belt regardless of the conditions or usage history, even under low-speed conditions where most would agree that any penalty or restriction would simply be annoying and use of the seat belt should be up to the discretion of the occupant (such as launching a boat, or repositioning a vehicle within a home garage).

This invention would not react unless the vehicle was being operated potentially unsafely, and then the response would be variable and according to recorded usage. The invention would not apply resistance until the seat belts are not fastened while the vehicle exceeds a threshold speed of, for example, ten miles an hour. When the resistance is applied, it is not simply on or off, but instead will continuously adjust with the occupant to provide more encouragement based on past usage. So, as the occupant ignores the invention's encouragement over time, the invention's encouragement becomes proportionally more insistent or resistant. However, when the vehicle is normally operated under the suggested conditions, the occupant will still receive a reminder to meet the suggested operating conditions when they are not met, but the response the occupant experiences will not be the same as what a repeat-offender experiences.

Additionally, the suggested operating conditions will adjust when they are not met. A considerable limitation found in the prior art is that the suggested operating conditions are rigid and do not adapt to the behavior of the occupant. For example, when the desired operating conditions do not adjust, the occupants learn and exploit the system, undermining the encouragement method, and possibly operating the vehicle too often under what would otherwise be safe conditions.

When an occupant is disinclined to follow the desired operating conditions, the encouragement will be actuated sooner than otherwise. For example, if the occupant frequently travels above the threshold speed without the seat belt fastened, instead of not encountering the resistance until twenty-five mph, the occupant will start experiencing the resistance at even lower speeds.

Perhaps even more useful, is that if the vehicle is operated too much under conditions that would normally be acceptable, the conditions under which the encouragement occurs adjust. For example, the established threshold speed is twenty mph, and normally operating the vehicle under twenty mph without the seat belt fastened may be acceptable. However, when the vehicle is operated at seventeen or eighteen mph for long periods of time without the seat belt fastened, the vehicle will encourage the occupant to fasten the seat belt speeds even lower than twenty mph, such as fifteen or sixteen mph.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
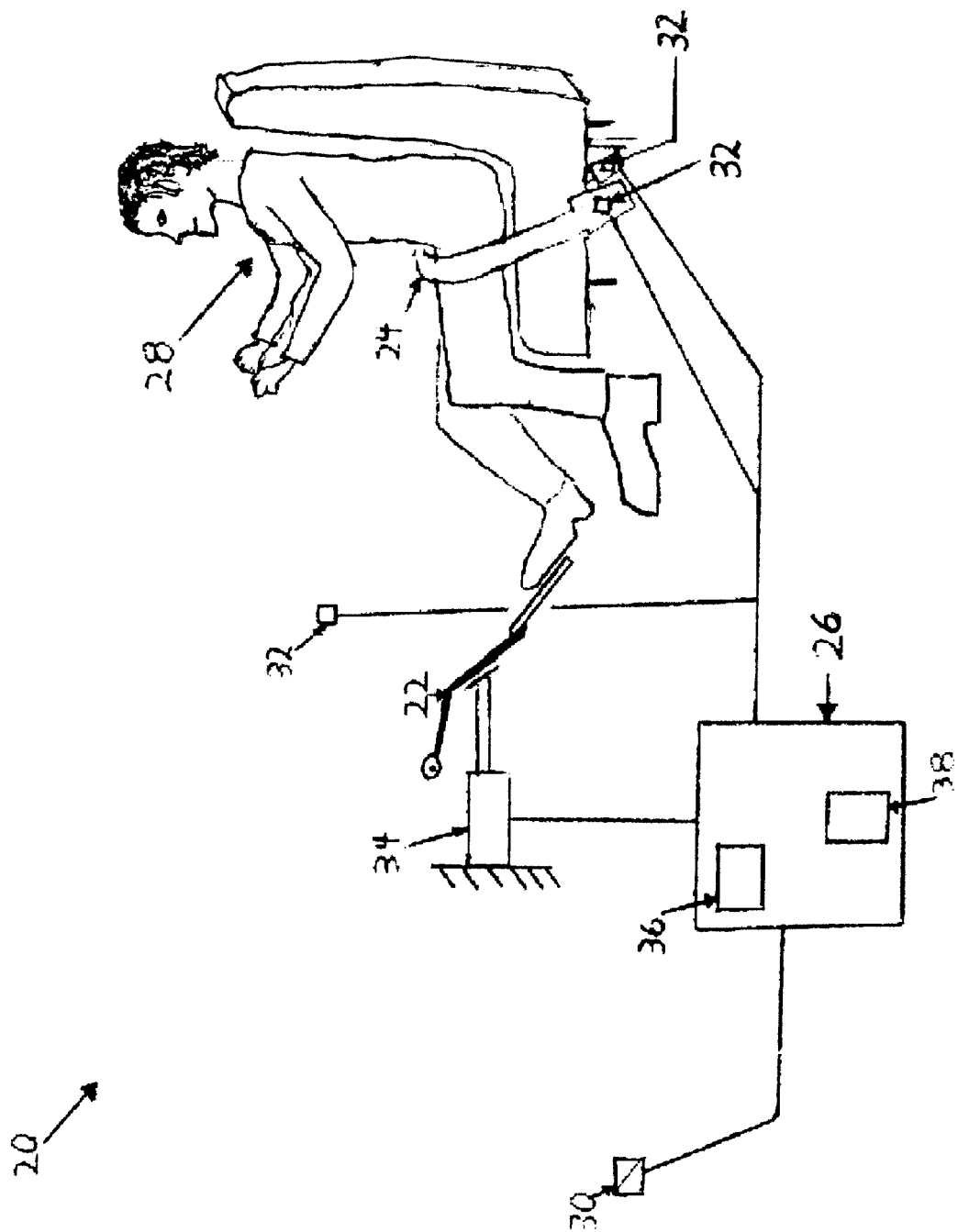
FIG. 1 is a schematic view of the invention.
Figure 2:
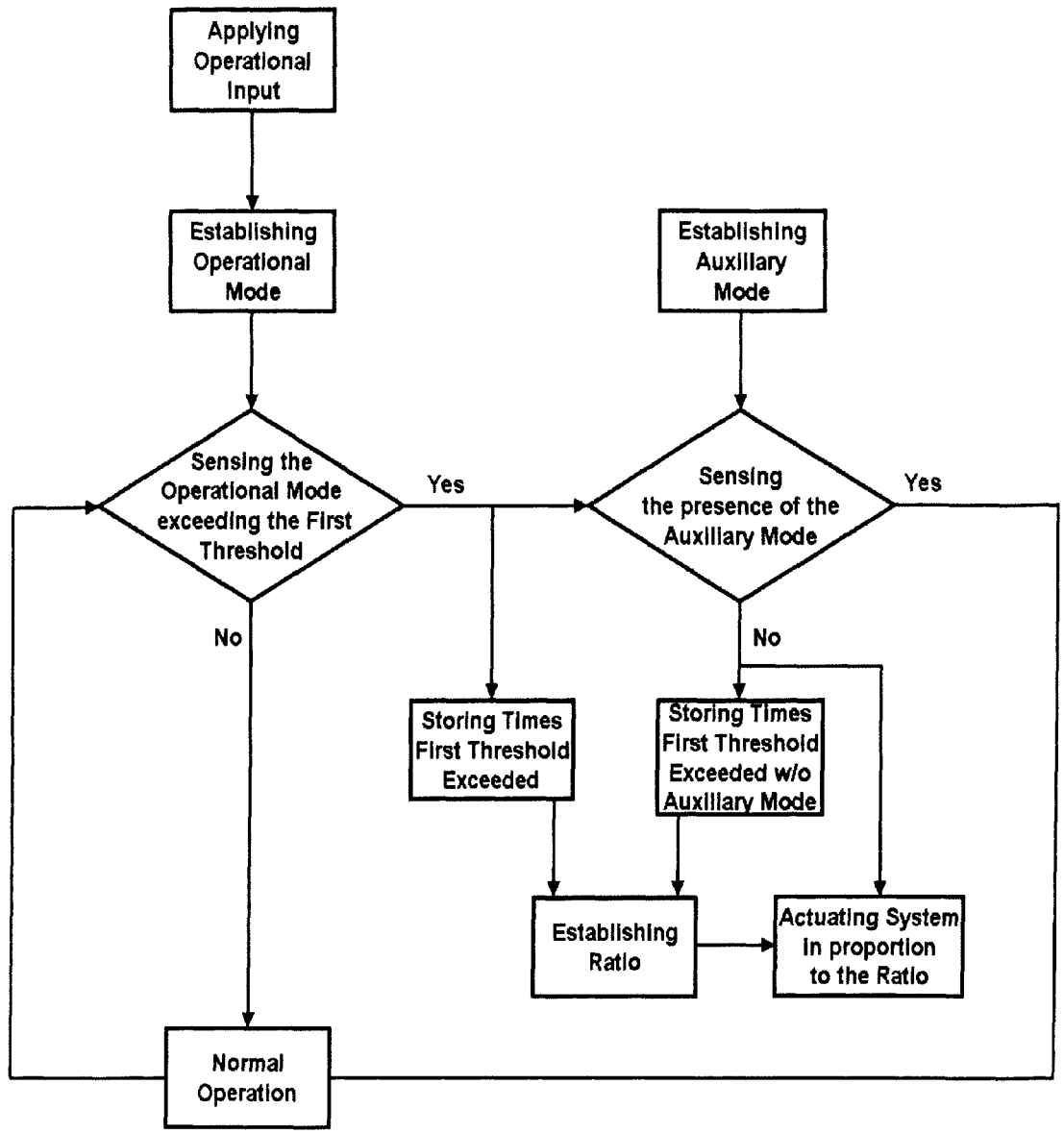
FIG. 2 is a block diagram of the broadest invention method.
Figure 3:
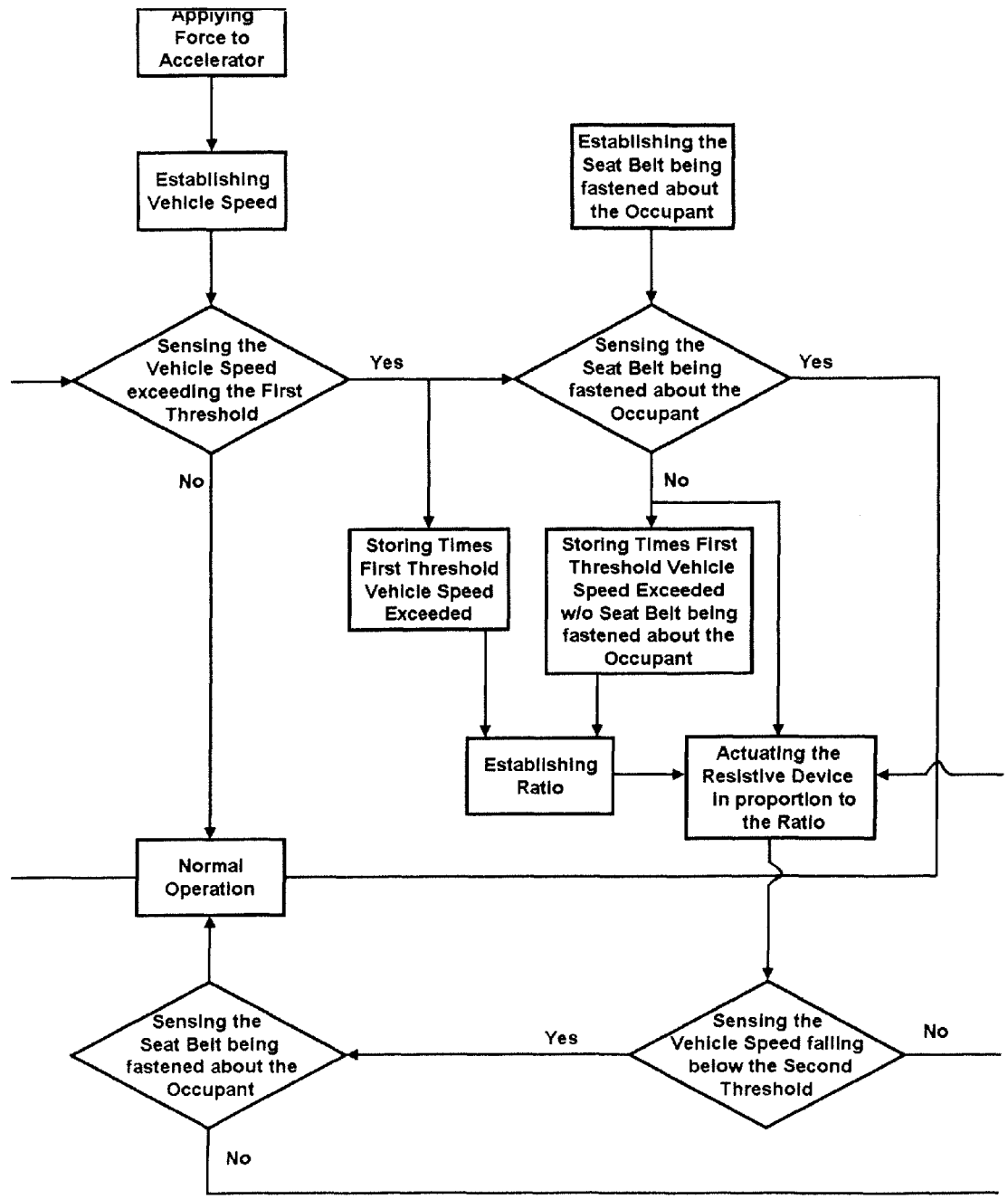
FIG. 3 is a block diagram of a more specific invention method.

Referring to the Figures, wherein like numerals indicate like or corresponding parts throughout the several views the subject invention includes a method of operating a vehicle 20 shown generally. The vehicle 20 could be one that travels across the ground, on tracks, on or under the water, or one that flies. The vehicle 20 is of the type including an accelerator 22, a seat belt 24, and a computer 26. The accelerator 22 may be a pedal, lever, or toggle generating rotational motion or translational motion that communicates either mechanically or electronically, directly or indirectly (as through a computer 26 that receives multiple inputs) to a fluid delivery system (for example a throttle, or fuel pump) or an electric power supply in order to change the power output of a motor or engine. For example, in a typical automobile, the accelerator 22 is a foot pedal, and when a vehicle occupant 28 depresses it, a cable connected to the pedal opens the throttle of the engine, which allows more air-fuel mixture to flow into the engine, which increases the power output of the engine.

The seat belt 24 is of the well-known type including a system of straps anchored securely in the vehicle 20 to maintain a vehicle occupant 28 in position within the vehicle 20 when engaged by snap and lock connectors, fasteners, buckles, or the like. A typical example of the normal operation of the seat belt 24 in vehicles 20 such as automobiles and aircraft is for a vehicle occupant to enter the vehicle 20, position themselves in a seat or bench, and then fasten the provided seat belt 24 provided from one side of their body across their lap and also perhaps across the front of their body from the shoulder to their hip into a receptacle that will hold the seat belt 24 securely, even if the vehicle 20 is involved in a violent jarring or collision.

The computer 26 receives signals, interprets and stores the signals as data, and is capable of processing the data and producing signals in response to the data according to a program stored on the computer 26 to direct its operation. The computer 26 includes a comparator 30, where data that has been stored in the program can be compared and resolved. The computer 26 includes a signal generator 32 whereby it can send signal commands to various actuators. An example of this type of computer 26 would include the ECU (engine control unit) on a contemporary automobile that receives signals from sensors 34, 36 located on the engine and other parts of the automobile, and uses this information to command vehicle components to adjust their operation, such as increasing air-fuel mixture into the engine.

The method includes the steps of applying an operational input of force to the accelerator 22 to establish an operational mode of the vehicle speed and sensing the operational mode of vehicle speed. Typically, the vehicle occupant 28 applies a force to the accelerator 22 by hand or by foot. Applying a force generally increases the speed of the vehicle 20 and the greater the force, the greater the increase of speed. A speed sensor 36 senses the vehicle speed and may be of the type commonly used on automobiles where the rotational speed of a rotating member (for example a wheel disk, or transmission output shaft) is measured, a pressure-differential type used by aircraft and watercraft, or a comparative positioning device that uses change in location measured by a satellite to calculate speed.

The method includes establishing an auxiliary mode of the vehicle 20 of the seat belt 24 being fastened and disposed about an occupant 28 and sensing the auxiliary mode. A plurality of sensors 34, 36 sense when the seat belt 24 is fastened and disposed about an occupant 28 by using position transducers to establish whether the seat belt 24 is fastened and the length of seat belt 24 that has been pulled out. For example, a potentiometer can translate a change in the physical position of an object into an electrical signal that can be magnified and interpreted by the computer 26. A proximity switch or Hall-effect sensor could be used to detect the absence of presence of an object, such as a belt buckle being fully inserted into a receptacle and communicate it through an electrical signal to the computer 26. Also, a light emitter aimed at the seat belt 24 with a reflector on the seat belt 24 and a phototransistor to receive the reflected light could be use to detect if the seat belt 24 is fastened in front the occupant.

The computer 26 stores the number of times the operational mode of vehicle speed exceeds a first predetermined threshold while storing in the computer 26 the number of incidents of the operational mode of vehicle speed exceeding the first predetermined threshold in the absence of the auxiliary mode. For example, if the first predetermined threshold is ten miles per hour (mph), the computer 26 will store the number of times this speed is exceeded, as well as the number of incidents that this speed is exceeded while the seat belt 24 is not fastened and disposed about the occupant 28.

The computer 26 actuates a resistive device 38 to apply a resistance to the application of the operational input of force to the accelerator 22 in response to each incident of the vehicle 20 exceeding the first threshold speed without the seat belt 24 being fastened. The computer 26 actuates the resistive device 38 to remove the resistance to the application of the operational input of force to the accelerator 22 in the presence of the auxiliary mode. However, the removal of the resistance to the application of the operational input of force to the accelerator 22 is prevented until the operational mode of vehicle speed falls below a second predetermined threshold. The resistance requires the occupant 28 to apply more force to the accelerator 22 to achieve the same result of increased vehicle speed, but the resistance is removed if the seat belt 24 is then fastened and the vehicle speed drops to the second predetermined threshold, for example, zero mph. This is a deterrent to moving at unsafe vehicle speeds without the speed belt fastened properly and it provides an incentive for safe operation of the vehicle 20.

In normal operation, for example, the occupant 28 enters the vehicle 20 and fastens the seat belt 24 before operating the vehicle 20 beyond the first threshold, which may be a relatively low vehicle speed. In this case, no resistance is applied to the application of force to the accelerator 22. However, if the occupant 28 operates the vehicle 20 beyond the first threshold speed without having the seat belt 24 fastened and disposed about him, then the occupant 28 will need to apply more force to the accelerator 22 to achieve the desired vehicle speed.

The resistance to the motion may be applied by a spring, a fluid damper, or a system using a combination of those. Resistance could be actuated or removed on a spring-type system by either a hydraulic cylinder or a motor and gear system moving the anchor point of the spring from a home position where the spring offers little or no resistance to positions of increased spring tension, providing higher resistance. In a damper type, the amount of incompressible fluid in the reservoir could be increased or decreased using a fluid pump and valves to change the amount of resistance.

The resistance is removed when the occupant 28 satisfies desired operating conditions, which may be different than the operating conditions that triggered the application of resistance. In the seat belt 24 and accelerator 22 example, the resistance applied to the application of the accelerator 22 will be removed once the seat belt 24 is fastened and other desired operating conditions are met. For vehicle 20 safety, it may not be safe for the occupant 28 to fasten the seat belt 24 until an operational mode such as vehicle speed is below a predetermined threshold. This is a great advantage in vehicles 20 where an occupant's appendages must remain on vehicle operational inputs or disposed in some other way to maintain safety. The occupant 28 is encouraged so that the vehicle 20 complies with desired operating conditions, but not in a way that can cause greater harm or danger.

The method is characterized by applying the resistance to the operational input of force to the accelerator 22 in proportion to the ratio of the number of incidents divided by the number of times the operational mode of vehicle speed exceeds the first predetermined threshold. More specifically, the number of incidents of the operational mode of vehicle speed exceeding the first predetermined threshold in the absence of the auxiliary mode of the seat belt 24 being fastened and disposed about an occupant 28 is divided by the number of times the operational mode of vehicle speed exceeds the first predetermined threshold to determine the degree of resistance to the operational input of force to the accelerator 22 to establish an operational mode of the vehicle speed.

In other words, when the occupant 28 fails to fasten the seat belt 24 before exceeding the first threshold speed, the occupant 28 requires more force input to attain a desired vehicle speed. The greater the number of incidents of the seat belt 24 not being fastened when a threshold speed is exceeded compared to the number of times the threshold speed is exceeded, the greater the resistance applied to the application of operator input to the accelerator 22. On the other hand, if the occupant 28 only occasionally misses fastening the seat belt 24, the resistance that is applied to the application of the accelerator 22 is less.

The first threshold is similarly adjusted in proportion to the ratio of the number of incidents divided by the number of times the operational mode of vehicle speed exceeds the first predetermined threshold. So, the greater the number of incidents of the seat belt 24 not being fastened when a threshold speed is exceeded compared to the number of times the threshold speed is exceeded, the lower the threshold speed at which resistance applied to the application of operator input to accelerator 22. Accordingly, encouragement is provided to an occupant 28 sooner when the established desired operating conditions are not met.

The first threshold is also adjusted in response to conditions that do not normally violate the desired operating conditions but nonetheless may be undesired. The length of time a threshold (besides the first threshold, and which perhaps is encountered before the first threshold) is exceeded in the absence of the auxiliary mode is compared with the length of time the vehicle 20 is operated above this threshold, and the first threshold is adjusted proportionally. For example, wearing a seat belt 24 may be discretionary as long as the vehicle 20 does not exceed seventeen mph. However, operating the vehicle 20 at fifteen mph for an extraordinary amount of time may result in encouragement to occupant to wear the seat belt 24, even though the vehicle 20 is being operated at below seventeen mph.

Obviously, many modifications and variations of the present invention are possible in light of the above teachings. The invention maybe practiced otherwise than as specifically described within the scope of the of the appended claims, wherein that which is prior art is antecedent to the novelty set forth in the "characterized by" claims. The novelty is meant to be particularly and distinctly recited in the "characterized by" clause whereas the antecedent recitations merely set forth the old and well-known combination in which the invention resides. These antecedent recitations should be interpreted to cover any combination in which the inventive novelty has utility. In addition, the reference numerals in the claims are merely for convenience and are not to be read in any way as limiting.

What is claimed is:

1. A method of controlling the behavior of the occupant of a vehicle with a resistive device and a control module and sensors to encourage compliance with desired operating conditions, and comprising the steps of;

applying an operational input with an input device to establish an operational mode of the vehicle, sensing with a first sensor the operational mode of the vehicle, establishing an auxiliary mode of the vehicle, sensing with a second sensor the auxiliary mode of the vehicle, storing in the control module the number of times the operational mode exceeds a first predetermined threshold, storing in the control module the number of incidents of the operational mode exceeding the first predetermined threshold in the absence of the auxiliary mode, applying a resistance with the resistive device to the application of the operational input in response to the incident, and characterized by applying the resistance with the resistive device to the operational input in proportion to the number of incidents divided by the number of times the operational mode exceeds the first threshold.

2. A method as set forth in claim 1 further defined by removing the resistance to the application of the operational input in the presence of the auxiliary mode.

3. A method as set forth in claim 2 further defined by preventing the removing of the resistance to the application of the operational input until the operational mode falls below a second predetermined threshold.

4. A method as set forth in claim 1 wherein the operational mode of the vehicle is vehicle speed.

5. A method as set forth in claim 1 wherein the auxiliary mode of the vehicle is a seat belt being fastened and disposed about an occupant.

6. A method as set forth in claim 1 further defined by adjusting the first threshold in proportion to the number of incidents divided by the number of times the operational mode exceeds the first threshold.

7. A method as set forth in claim 1 further defined by storing the length of time the operational mode exceeds an nth predetermined threshold,
storing the length time the operational mode exceeds the nth threshold in the absence of the auxiliary mode,
and adjusting the first threshold in proportion to the length of time the operational mode exceeds an nth threshold in the absence of the auxiliary mode divided by the length of time the operational mode exceeds the nth threshold.

8. A method of controlling the behavior of the occupant of a vehicle of the type including an accelerator, a seat belt, and a computer to encourage compliance with desired operating conditions, and comprising the steps of;
applying an operational input of force to the accelerator to establish an operational mode of the vehicle speed,
sensing the operational mode of the vehicle speed,
establishing an auxiliary mode of the vehicle of the seat belt being fastened and disposed about an occupant,
sensing the auxiliary mode of the vehicle of the seat belt being fastened and disposed about an occupant,
storing in the computer the number of times the operational mode of vehicle speed exceeds a first predetermined threshold,
storing in the computer the number of incidents of the operational mode of the vehicle speed exceeding the first predetermined threshold in the absence of the auxiliary mode of the seat belt being fastened and disposed about an occupant,
storing in the computer the length of time the operational mode of vehicle speed exceeds an nth predetermined threshold,
storing in the computer the length of time the operational mode of vehicle speed exceeds the nth threshold divided by the length of time the operational mode exceeds the nth threshold in the absence of the auxiliary mode,
applying a resistance to the application of the operational input of force to the accelerator in response to each incident,
removing the resistance to the application of the operational input of force to the accelerator in the presence of the auxiliary mode of the vehicle of the seat belt being fastened and disposed about an occupant,
preventing the removing of the resistance to the application of the operational input of force to the accelerator until the operational mode of vehicle speed falls below a second predetermined threshold,
characterized by applying a resistance to the operational input of force to the accelerator being further defined as applying the resistance in proportion to the ratio of the number of incidents divided by the number of times the operational mode of vehicle speed exceeds the first predetermined threshold,
adjusting the first threshold of vehicle speed in proportion to the number of incidents divided by the number of times the operational mode of vehicle speed exceeds the first threshold, and
adjusting the first threshold of vehicle speed in proportion to the length of time the operational mode of vehicle speed exceeds an nth threshold in the absence of the auxiliary mode of the scat belt being fastened and disposed about an operator divided by the length of time the operational mode exceeds the nth threshold.

9. A vehicle controlling the behavior of the vehicle occupant to encourage compliance with desired operating conditions comprising;
an input device to apply an operational input to establish an operational mode of said vehicle,
a first sensor to measure said operational mode,
an auxiliary device to establish an auxiliary mode of said vehicle,
a second sensor to detect said auxiliary mode,
a control module to store the number of times said operational mode exceeds a first threshold, and to store the number of incidents that said operational mode exceeds said first threshold in the absence of said auxiliary mode,
a system to apply resistance to the application of the operational input,
said control module including a signal generator for actuating said system to apply resistance to the application of the operational input in response to each said incident, and
characterized by said control module including a comparator controlling said signal generator for actuating said system to apply resistance to the operational input in proportion to the ratio of the number of said incidents divided by the number of times said operational mode exceeds said first threshold.

10. An apparatus as set forth in claim 9 where said input device is an accelerator.

11. An apparatus as set forth in claim 9 where said first sensor is a sensor to measure vehicle speed.

12. An apparatus as set forth in claim 9 where said auxiliary device is a seat belt.

13. An apparatus as set forth in claim 9 where said second sensor detects said seat belt being fastened and disposed about an occupant.

14. An apparatus as set forth in claim 9 where said control module is a computer.

15. An apparatus as set forth in claim 9 where said system is a resistive device.

16. A vehicle controlling the behavior of the vehicle occupant to encourage compliance with desired operating conditions comprising;
an accelerator for applying an operational input of force to establish an operational mode of said vehicle speed,
a speed sensor to measure said operational mode of vehicle speed,
a seat belt to establish an auxiliary mode of said seat belt being fastened and disposed about an occupant,
seat belt sensors to detect said auxiliary mode of said seat belt being fastened and disposed about an occupant,
a computer responsive to said sensors to store the number of times said operational mode of vehicle speed exceeds a first predetermined threshold, and to store the number of incidents of said operational mode of said vehicle speed exceeding said first threshold in the absence of said auxiliary mode of said seat belt being fastened and disposed about an occupant, a resistive device to apply resistance to the application of the operational input of force on said accelerator, said computer including a signal generator for actuating said resistive device to apply resistance to application of an operational input of force to said accelerator in response to each incident, to remove said resistance to the application of the operational input of force to said accelerator in the presence of said auxiliary mode of said seat belt being fastened and disposed about an occupant, actuating said resistance device to remove said resistance to the application of said operational input of force to said accelerator only after said operational mode of vehicle speed falls below a second predetermined threshold for a predetermined length of time, and characterized by said computer including a comparator controlling said signal generator for actuating said resistive device to apply resistance to the operational input of force to said accelerator in proportion to the ratio of the number of said incidents divided by the number of times said operational mode of said vehicle speed exceeds said first threshold.

* * * * *